E. FINN.

Vehicle Axle

No. 84,940. Patented Dec. 15, 1868.

Witnesses,
Wm A. Morgan
Ph. C. Dieterich

Inventor,
E. Finn.
per Munn & Co
Attorneys

EDWARD FINN, OF BERLIN, WISCONSIN.

Letters Patent No. 84,940, dated December 15, 1868.

IMPROVEMENT IN AXLES.

The Schedule referred to in these Letters Patent and making part of the same.

*To all whom it may concern:*

Be it known that I, EDWARD FINN, of Berlin, in the county of Green Lake, and State of Wisconsin, have invented a new and useful Improvement in Axles of vehicles; and I do hereby declare that the following is a full, clear, and exact description thereof, which will enable those skilled in the art to make and use the same, reference being had to the accompanying drawings, forming part of this specification, in which—

Similar letters of reference indicate corresponding parts.

Figure 1:
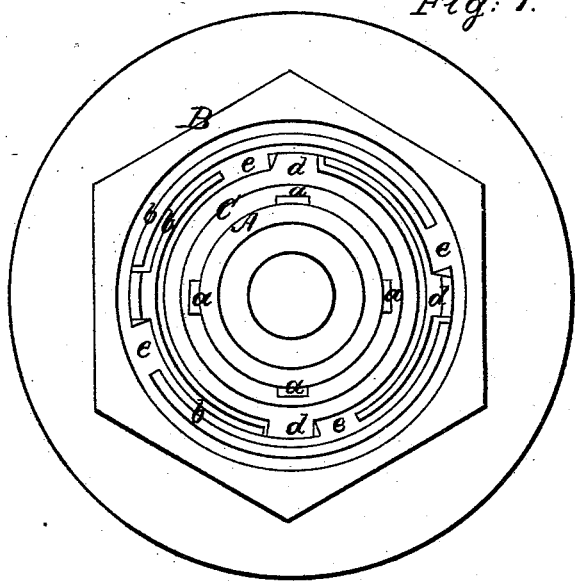
Figure 1 is a front perspective of the nut and axle, the latter being in rear of the nut, at a distance behind it, and seen through the hole of the nut.
Figure 2:
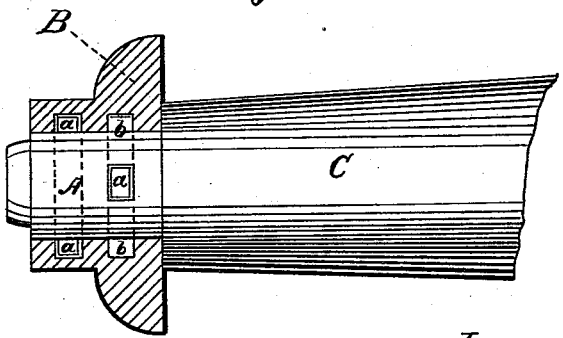
Figure 2 is a sectional view of the nut, showing the axle inserted in it.

The object of this invention is to provide the means of easily and quickly removing or putting on the nuts of axles, and, at the same time, enabling the same to be firmly held in place.

It consists in substituting, for the usual screw-threads of the nut and axle, a series of projections, $a$, on the reduced end, A, of the axle C, and a series of annular slots $b$, formed in the eye of the nut B, communicating with each other by short longitudinal slots or entrances $d$.

The projections $a$ are arranged in two or more rows around the part A, there being two or more of said projections in each row.

By referring to the drawings, the principle of the invention will be evident.

To set on the nut, the projections are entered into the first entrances, $d$, until they encounter the sides of the first annular slots.

The nut is then turned until the second set of projections is brought before the first entrances, at which the first set of projections entered, which latter will then be before the entrances to the second annular slots, and will enter them as the second set of projections is entering the first entrances.

The nut is then turned to bring all the projections up against the ends $e$ of their respective slots.

In putting in the nut, it is pressed against, while it is turned so that the projections will slip into the entrances when brought before them.

Two sets of projections are sufficient in practice, but the number may be multiplied, if desired, in which case the annular slots must also be correspondingly multiplied.

When fitted tightly, a set-screw will not be necessary, but one may be added, if desired, for additional security.

It should pass through one of the faces of the hexagonal part of the nut, and enter upon the part A, through one of the annular slots.

I claim as new, and desire to secure by Letters Patent—

The combination of the nut B, having annular slots $b\ b$ and entrances $d\ d$, with the axle C A, having projections $a\ a$, arranged substantially as described, and for the purpose set forth.

The above specification of my invention signed by me, this 2d day of September, A. D. 1868.

EDWARD FINN.

Witnesses:
 THOS. C. RYAN,
 M. A. HINLEY.